(12) United States Patent
Wang et al.

(10) Patent No.: US 9,996,891 B2
(45) Date of Patent: Jun. 12, 2018

(54) SYSTEM AND METHOD FOR DIGITAL WATERMARKING

(71) Applicant: Deluxe Media Inc., Burbank, CA (US)

(72) Inventors: Ruopeng Wang, Santa Clarita, CA (US); Joel Bigley, Valencia, CA (US)

(73) Assignee: Deluxe Media Inc., Burbank, CA (US)

( * ) Notice: Subject to any disclaimer, the term of this patent is extended or adjusted under 35 U.S.C. 154(b) by 126 days.

(21) Appl. No.: 15/145,565

(22) Filed: May 3, 2016

(65) Prior Publication Data

US 2016/0364826 A1    Dec. 15, 2016

Related U.S. Application Data

(60) Provisional application No. 62/173,835, filed on Jun. 10, 2015.

(51) Int. Cl.
| | |
|---|---|
| *G06T 1/00* | (2006.01) |
| *H04N 1/32* | (2006.01) |
| *H04N 21/8358* | (2011.01) |

(52) U.S. Cl.
CPC .......... *G06T 1/0078* (2013.01); *G06T 1/0071* (2013.01); *H04N 1/3232* (2013.01); *H04N 1/32245* (2013.01); *H04N 1/32267* (2013.01); *H04N 1/32288* (2013.01); *H04N 21/8358* (2013.01); *G06T 2201/0051* (2013.01); *G06T 2201/0063* (2013.01)

(58) Field of Classification Search
CPC ... G06T 1/0021; G06T 1/0028; G06T 1/0071; G06T 2201/0051; H04N 1/32229; H04N 1/32245; H04N 1/32267; H04N 1/32288; H04N 1/32293; H04N 1/32304; H04N 1/32352

See application file for complete search history.

(56) References Cited

U.S. PATENT DOCUMENTS

| | | | |
|---|---|---|---|
| 2001/0044899 A1* | 11/2001 | Levy .............................. | 713/176 |
| 2006/0075239 A1* | 4/2006 | Bruekers et al. ............. | 713/176 |
| 2006/0280246 A1 | 12/2006 | Alattar et al. ........... | 375/240.15 |
| 2011/0091066 A1 | 4/2011 | Alatter .......................... | 382/100 |
| 2011/0164784 A1* | 7/2011 | Grill et al. .................... | 382/100 |
| 2012/0027207 A1 | 2/2012 | Lee et al. ...................... | 380/205 |
| 2014/0185952 A1 | 7/2014 | Cabral .................... | G06T 5/003 |

OTHER PUBLICATIONS

International Search Report dated Sep. 22, 2016, in PCT Application No. PCT/US2016/033291, 5 pages.
Written Opinion dated Sep. 22, 2016, in PCT Application No. PCT/US2016/033291, 6 pages.

* cited by examiner

*Primary Examiner* — Andrew W Johns
(74) *Attorney, Agent, or Firm* — Dorsey & Whitney LLP

(57) ABSTRACT

A digital watermarking system and method are disclosed. In one respect, the disclosed digital watermarking includes generating an extracted signal by applying a watermark extractor to an original image, generating a mixed signal by mixing the first signal with a periodic watermark signal using a local weighting factor for the periodic watermark signal that attenuates a strength of the watermark signal in proportion to a pixel luminance level, and replacing the extracted signal in the original image with the mixed signal to generate a marked image, wherein the watermark signal is extractable from the marked image using the watermark extractor.

47 Claims, 4 Drawing Sheets

SYSTEM AND METHOD FOR DIGITAL WATERMARKING

CROSS REFERENCE TO RELATED APPLICATIONS

The present application claim priority to U.S. Provisional Patent Application No. 62/173,835, filed on Jun. 10, 2015 and entitled "System and Method for Digital Watermarking", which is hereby incorporated herein by reference in its entirety.

TECHNICAL FIELD

The present disclosure relates generally to systems and methods for digital watermarking. More particularly, the present disclosure relates to systems, devices, methods and processes for robustly and unobtrusively marking and identifying digitally created, produced, processed, presented, rendered and saved content.

BACKGROUND

Recently, digital watermarking has attracted attention as a possible solution for multimedia copyright protection. Digital watermarking is a process of embedding copyright and/or other identifying information in multimedia data such as songs, videos, graphics, publications and otherwise. Such digital watermarks may range from being readily visible to a person's naked eye to invisible. Digital watermarks may be used for a variety of content identification, notification, piracy prevention and other purposes. In many implementations today, digital watermarks are limited to only a single rendering, duplication, presentation, production or otherwise of a given work of multimedia data. Similarly, in many implementations today, digital watermarks may not be robust to piracy attempts, such as may occur by the reorientation of a work from its original intended form to a form which prohibits or significantly interferes with the detection and/or identification of a digital watermark. Likewise, in many implementations today, digital watermarks may be visibly or readily identifiable using known techniques, e.g., opaque, to a potential pirate or other unauthorized user of the underlying digital content. Such opacity may result in the detection, deletion and/or modification of such digital watermark, thereby, hampering anti-piracy efforts and enforcement, royalty calculations and other efforts related to the authorized and unauthorized use of marked digital multimedia content. Thus, to be effectively used for the copyright protection and other purposes, digital watermarking should be unobtrusive, identifiable by those needing to so identify and robust against piracy and otherwise. Unobtrusiveness means that watermark embedding should not affect the quality of data. Identifiable means that a person knowing of the existence and characteristics of a digital watermark can readily detect the same and identify the origin of the content, as watermarked, at a given and/or desired point along the multi-media content's production (both pre and post), distribution and/or reproduction life cycle. Robustness refers to the requirement that embedded watermarks should be detected reliably even after some attacks.

The information included in this Background section of the specification, including any references cited herein and any description or discussion thereof, is included for technical reference purposes only and is not to be regarded as subject matter by which the scope of the invention as defined in the claims is to be bound.

SUMMARY

The various embodiments of the present disclosure provides systems, devices and methods for digitally marking content with watermarks which are unobtrusive, identifiable and robust in the face of one or more "attacks"—as further defined below.

In accordance with at least one embodiment, systems, methods and devices for digitally watermarking content may watermark content by generating an extracted signal from a given original image by applying a watermark extractor to an original image, generating a mixed signal by mixing the extracted signal with a periodic watermark signal using a local weighting factor for the periodic watermark signal that attenuates a strength of the periodic watermark signal in proportion to a pixel luminance level, and replacing the extracted signal in the original image with the mixed signal to generate a marked image, wherein the periodic watermark signal is extractable from the marked image using the watermark extractor.

In accordance with at least one embodiment, systems, methods and devices for digitally watermarking content may watermark content by use of one or more operations where such operations include mixing a signal extracted from an original image with a periodic watermark signal by generating a local weighting factor using a noise visibility function having a gradient removal factor that prevents the noise visibility function from significantly incrementing at locations of spatial gradient in the original image.

In accordance with at least one embodiment, systems, methods and devices for digitally watermarking content may watermark content by use of one or more operations where such operations include mixing a signal extracted from an original image with a periodic watermark signal by generating a local weighting factor using a noise visibility function having a density filter that prevents the periodic watermark signal from becoming visible in the marked image at spatial locations with highly dense textures.

In accordance with at least one embodiment, systems, methods and devices for digitally watermarking content may watermark content by use of one or more operations where such operations include mixing a signal extracted from an original image with a periodic watermark signal, wherein the mixing of the extracted signal with the periodic watermark signal includes applying a watermark block of size M×M to corresponding M×M sections of the extracted signal.

In accordance with at least one embodiment, systems, methods and devices for digitally watermarking content may watermark content by use of one or more operations where such operations include mixing a signal extracted from an original image with a periodic watermark signal, wherein the mixing of the extracted signal with the periodic watermark signal includes applying a watermark block of size M×M to corresponding M×M sections of the extracted signal, and the watermark block is generated by operations including: generating a plurality of pseudo random numbers using a unique input identification as a seed; generating a N(0,1) normal distributed random number in double precision using one of the plurality of pseudo random numbers as a seed; using the normal distributed random number to populate a watermark pattern sequentially; and applying low-pass filtering of kernel size 3 on the watermark block to limit the frequency band.

In accordance with at least one embodiment, systems, methods and devices for digitally watermarking content may watermark content by use of one or more operations where such operations include mixing a signal extracted from an original image with a periodic watermark signal, wherein the mixing of the extracted signal with the periodic watermark signal includes applying a watermark block of size 64×64 to corresponding M×M sections of the extracted signal, and generating a plurality of 4096 pseudo random numbers, where at least one of such pseudo random numbers is used as a seed in generating a N(0,1) normal distributed random number.

In accordance with at least one embodiment, a unique input identification used as a seed is 32 bits in length.

In accordance with at least one embodiment, systems, methods and devices for digitally watermarking content may watermark content by use of one or more operations where a first periodic watermark signal is used to mark an original image and such operations include generating a third signal by applying a watermark extractor to an image marked using the first periodic watermark signal, generating a fourth signal by mixing the third signal with a second periodic watermark signal using a local weighting factor for the second periodic watermark signal that attenuates a strength of the second periodic watermark signal in proportion to a pixel luminance level, replacing the third signal in the marked image with the fourth signal to generate an additional marked image, wherein either or both of the first and second periodic watermark signals are extractable from the additional marked image using the watermark extractor.

In accordance with at least one embodiment, the operation of replacing the extracted signal in the original image with the mixed signal and the operation of replacing the third signal in the marked image with the fourth signal occur at different stages of distribution of the original images.

In accordance with at least one embodiment, an original image is an individual frame of a digital video.

In accordance with at least one embodiment, an original image is an individual frame of a streaming video. In accordance with at least one embodiment, operations may be selectively applied on either I frames or subsequent P frames of a streaming video.

In accordance with at least one embodiment, a watermark extractor uses a Wiener filter, a Helicon filter, or similar type of filter.

In accordance with at least one embodiment, a periodic watermark signal is normalized.

In accordance with at least one embodiment, systems, methods and devices for digitally watermarking content may watermark content by use of one or more operations including applying an electro-optical transfer function to an original image to generate an EOTF image, generating an extracted signal by applying a watermark extractor to the EOTF image, generating a mixed signal by mixing the extracted signal with a periodic watermark signal using a local weighting factor for the periodic watermark signal that attenuates a strength of the watermark signal in proportion to a pixel luminance level, replacing the extracted signal in the EOTF image with the mixed signal to generate a marked image, and applying an optical-electro transfer function to the marked image to generate a final marked image, wherein the optical-electro transfer function utilized performs an inverse operation of the electro-optical transfer function, and wherein the periodic watermark signal is extractable from the final marked image.

In accordance with at least one embodiment, an electro-optical transfer function is utilized and applied to an original image to be watermarked. In accordance with at least one embodiment, the electro-optical transfer function is applied prior to an extracted signal is generated from an original image. In accordance with at least one embodiment, an electro-optical transfer function applies at least one of a constant gamma correction, a SMPTE 2084 standard compliant transfer function, a Dolby Perceptual Quantizer, or a transfer function compliant with the ITU-R Recommendation BT.2020 to an original image.

In accordance with at least one embodiment the original image includes content having a high dynamic range.

In accordance with at least one embodiment, an original image has highly varying ranges of luminance.

In accordance with at least one embodiment, systems, methods and devices for digitally watermarking content may watermark content by use of one or more operations including applying an electro-optical transfer function to an original image to generate an EOTF image, generating an extracted signal by applying a watermark extractor to the EOTF image, generating a mixed signal by mixing the extracted signal with a periodic watermark signal using a local weighting factor for the periodic watermark signal that attenuates a strength of the watermark signal in proportion to a pixel luminance level, wherein the local weighting factor uses a noise visibility function having a gradient removal factor that prevents the noise visibility function from significantly incrementing at locations of spatial gradient in the EOTF image, replacing the extracted signal in the EOTF image with the mixed signal to generate a marked image, and applying an optical-electro transfer function to the marked image to generate a final marked image, wherein the optical-electro transfer function utilized performs an inverse operation of the electro-optical transfer function, and wherein the periodic watermark signal is extractable from the final marked image.

In accordance with at least one embodiment, a local weighting factor is generated using a noise visibility function having a density filter that prevents a watermark from becoming visible at spatial locations with highly dense textures.

In accordance with at least one embodiment, low-pass filtering may be utilized and such low-pass filtering may utilize a kernel size of 3.

In accordance with at least one embodiment, a watermark extractor may utilize an average of two or more local noise variances for an original image to generate an extracted signal.

In accordance with at least one embodiment, a final image is humanly perceptible and includes a watermark having a noise pattern that resembles film grain.

In accordance with at least one embodiment, a periodic watermark signal may uniquely identify a viewer, a time at which a final image is communicated to the viewer, or any other desired information.

In accordance with at least one embodiment, an original image may be a frame of a streaming video to be communicated to a viewer over a telecommunications network, such as the Internet.

In accordance with at least one embodiment, a periodic watermark signal may be dynamically generated and applied to the EOTF image of a frame of a streaming video immediately prior to a time of communication of a final image in the streaming video to a viewer.

In accordance with at least one embodiment, a mixed signal may be generated based on an embedding interval. In accordance with at least one embodiment, a final image is communicated to a receiving device over a network connection and an embedding interval is determined based on a target CPU load for a streaming server utilized to communicate the final image to a receiving device, such as a home set-top box, a smart-phone, computer, or other device suitable for receiving and presenting a final image to a viewer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

The accompanying drawings, which are incorporated in and constitute a part of the specification, illustrate examples of the disclosure and, together with the general description given above and the detailed description given below, serve to explain the principles of these examples.

DETAILED DESCRIPTION

As discussed herein in greater detail with respect to one or more disclosed embodiments, devices, systems and processes are provided for digitally watermarking multimedia content. It is to be appreciated that an embodiment disclosed herein and intended to be used with a wide range of multimedia contents and formats ranging, for example, from 4K to High Definition, to Standard Definition. Such multimedia content may be of any desired form, including but not limited to, video, audio, graphical, textual, combinations of the foregoing or otherwise. It is to be further appreciated that the various embodiments described herein requires the use of specially configured computers and is not generally capable of being implemented using general purpose computers. It is to be appreciated that the data quantity, data rates, compression, encryption and other technologies utilized do not render the various embodiments of the present disclosure suitable for implementation on general purpose computers. Examples of digital multimedia data processing systems on which the various embodiments disclosed herein are intended to operate include, but are not limited to, multiple processor systems having hardware acceleration capacity. Example systems include multiple processors with 32 cores, an FPGA PCI-e board for hardware acceleration of embedding processes and certain video codec handling capabilities, a fiber channel connection to storage, and software for encrypted communication to a centralized database designed for watermark ID management.

The various embodiments disclosed herein are intended to facilitate the digital watermarking of content, such that the watermarks applied to any given multimedia content is unobtrusive, identifiable and robust. As described herein and otherwise to be appreciated, a digital watermark used using any of the embodiments herein should be applicable to a whole or a part, of a multimedia content and may be utilized at one or more stages of the production, distribution, presentation, storage and other portion of a given work of multimedia content's life cycle.

Figure 1A:
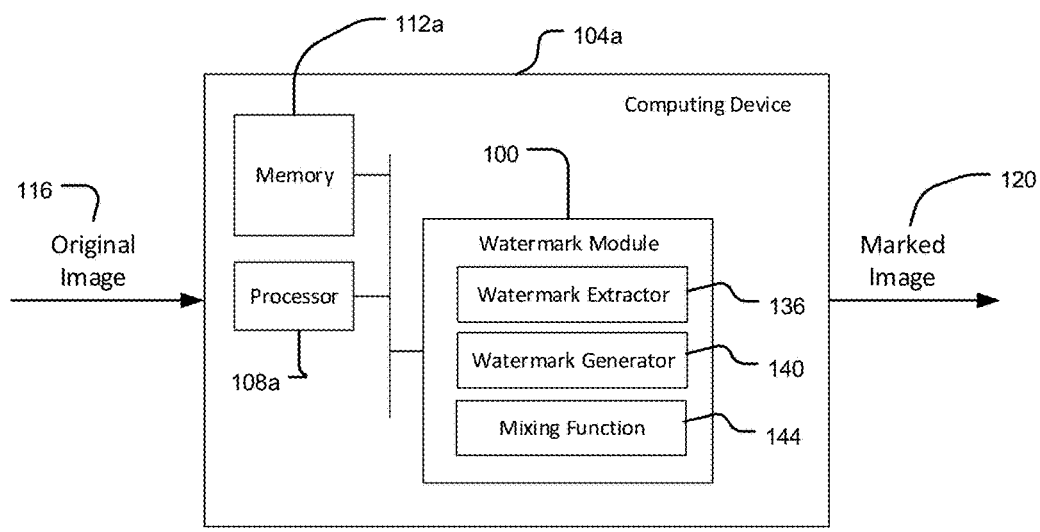
FIG. 1A is a schematic illustration for a general operating environment for a watermark module provided, for example, in a special purpose computing device and/or as a computer readable medium containing one or more lines of computing software code for use in configuring a special purpose computing device in accordance with at least one embodiment of the present disclosure.

As shown in FIG. 1A, a watermark module 100 may be associated with a special purpose computing device 104a, such as one of those identified above or one having similar or greater capabilities. Such computing device includes at least one processor 108a. It is to be appreciated that for certain types of multimedia content, such as 4K video content, the operations described herein may arise with respect to one or more processors operating in parallel, serial, tandem or otherwise on a whole or a portion of any given multimedia content, including a whole or a portion of a given sampling, such as a frame, of such multimedia content. The processing capabilities may be further provided in a cloud-type, distributed or other computing environment where a given processing load may be distributed, at any given time, by and between two or more processors. The watermark module 100 may be configured as computer executable code stored in a memory 112a or other non-transitory computer-readable storage medium. When called, the code is executed by the processor(s) 108a. The memory 112a is shown in FIG. 1A as being co-resident with the processor(s) 108a, but, such memory may also and/or alternatively be provided using cloud, distributed, resident, remote or other data storage systems and topologies. Further, through the operation of the special purpose computing device 104a, the watermark module 100 or component thereof may be loaded from memory 112a and executed by the processor 108a thereby forming a special purpose computing device and/or system. In at least one embodiment, such special purpose computing device and/or system is compatible with multimedia content that may be provided in a native format (as captured by a capturing devices such as a digital camera, microphone or otherwise), encrypted, compressed, or otherwise processed. The watermark module 100 may include a number of component modules that are executed by the special purpose computing device's processors, memory and other common computing components to perform various functions. As described in greater detail below, the watermark module 100 may configure the special purpose computing device 104a to include various components such as watermark extractor 136, watermark generator 140, and a mixing function 144. In operation, the watermark module 100 may receive an original image 116 as input and provides a marked image 120 as output. The marked image 120 includes the original image 116 along with at least one embedded watermark. When needed, the watermark may be extracted or otherwise detected in the marked image 120 by an inverse process executed by the watermark module 100 or by another instance of the watermark module 100 executing on a separate special purpose computing device.

Figure 1B:
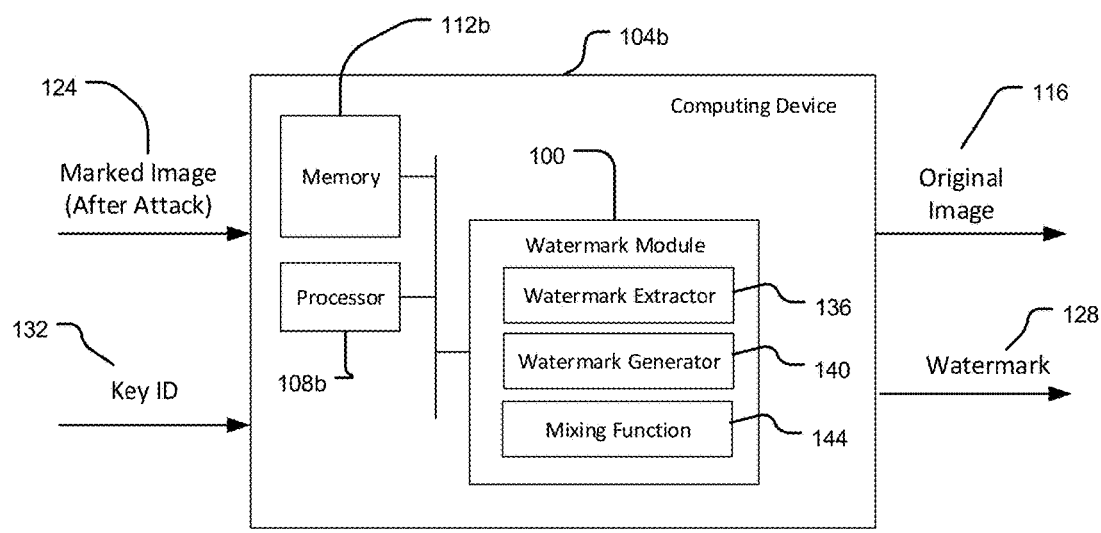
FIG. 1B is an additional schematic illustration of a general operating environment for a watermark module provided, for example, in a special purpose computing device and/or as a computer readable medium containing one or more lines of computing software code for use in configuring a special purpose computing device that shows a watermark extraction process for at least one embodiment of the present disclosure.

The watermark extraction process is generally illustrated in FIG. 1B, which is an additional schematic illustration of a general operating environment of a special purpose computing device including a watermark module 100 in accordance with at least one embodiment of the present disclosure. By way of example, FIG. 1B includes a second special purpose computing device 104b that implements a separate instance of watermark module 100. The second special purpose computing device 104b may be the same device(s) as the first special purpose computing device 104a or may be different. It is to be appreciated that an originator of multimedia content watermarked in accordance with at least one embodiment described herein may desire to utilize the same special purpose computing device(s) to detect and extract one or more digital watermarks as are used to embed such watermarks. It is to be appreciated that the marked image 120, during distribution of such image or otherwise (such image 120 post distribution thereof being identified by reference number 124), may undergo one or more attacks, as discussed below. In FIG. 1B, the watermark module 100 receives the marked image 124 as input and applies an inverse process to extract the watermark 128 from the marked image 124. In so doing, the watermark module 100 utilizes a key identification 132 that was used in the first process that added the watermark 128 to the original image 116. Generally, the key identification 132 is a predetermined number represented in digital form by a number of bits. The number of bits used may depend on the size of the predetermined number used as the key identification 132. In one embodiment, the key identification 132 is represented by a 24-bit digital number. In the process depicted in FIG. 1A, the key identification is used in a random number generation process to generate the watermark signal, which is then added to the original image 116 to form the marked image 120. As shown in FIG. 1B, the watermark module 100 may apply an inverse process to extract the watermark 128 from the marked signal 124 (post distribution and/or attack) provided that the key identification 132 is known to the second computing device 104b.

Prior to being received as input to the second computing device 104b, the marked signal may have suffered an "attack." As used herein an "attack" refers to a modification of the marked signal 120 after the marked signal 120 is stored, transmitted or otherwise distributed by the first computing device 104a that marked the original image signal 116. In some instances, the marked signal 120 is modified in a deliberate attempt to make the watermark 128 undetectable. However, an attack is not necessarily malicious and may occur as a result of signal processing that is intended to achieve some other result. A geometric attack is one example of an attack that the marked signal 120/124 (post distribution or attack) may have suffered. In this type of attack, the embedded watermark may become desynchronized from the reference watermark and detection of the embedded watermark may be effected as a result. The marked signal 120 may also suffer a removal attack where the marked signal 120 is subjected to some processing that removes or attenuates the embedded watermark signal. Examples of removal attacks include analog-to-digital (A/D), digital-to-analog (D/A) conversions, and lossy compression. In some instances, marked signal 120 may suffer a combined geometric and removal attack. The printing-scanning process is one example of a combined attack. Here, when the marked signal 120 is printed, the marked signal 120 may be subject to some amount of rotation or scaling, both of which tend to desynchronize the embedded watermark from the reference watermark thus resulting in a geometric attack. Additionally, when A/D or D/A conversions are applied to the printed signal, removal attacks may occur.

Generally, the watermark module 100 implements an autocorrelation function (ACF) based watermarking scheme. In ACF based watermarking, a periodic watermark pattern is embedded into an image. The periodic watermark makes periodic peaks in the ACF of the watermark. During the detection process, the geometric transforms that have been applied to the marked image are estimated by inspecting the pattern of the extracted peak. The watermark module 100 is configured to implement a watermarking scheme that avoids detection failure modes that are sometimes are associated with ACF watermarking. While ACF watermarking is generally considered effective against attacks including combined geometric-removal attacks, the robustness of ACF watermarking is somewhat dependent on the strength of the autocorrelation peaks. When the autocorrelation peaks are weak or disturbed, the embedded watermark may become undetectable. The watermark module 100 avoids this failure mode by reducing interferences in the autocorrelation function that are introduced by watermark estimation error of the watermark extractor. Here, the watermark extractor that will be ultimately used to extract the watermark from the marked signal is initially applied to the original image signal. The watermark module 100 uses this information when embedding the watermark so as to approximately predict the estimation error that will be extracted during the detection process.

In addition to improving the robustness of ACF watermarking as described above, the watermark module 100 includes a number of features that improve the unobtrusiveness of the watermark. In one respect, the watermark module 100 generates a periodic watermark signal using a local weighting factor for the periodic watermark signal that attenuates the strength of the watermark signal in proportion to a pixel luminance level. In another respect, the watermark module 100 generates the local weighting factor using a noise visibility function having a gradient removal factor that prevents the noise visibility function from significantly incrementing at locations of spatial gradient in the original image. The watermark module 100 may also generate the local weighting factor using a noise visibility function having a density filter that prevents the watermark filter from becoming visible at spatial locations with highly dense textures.

Figure 2:
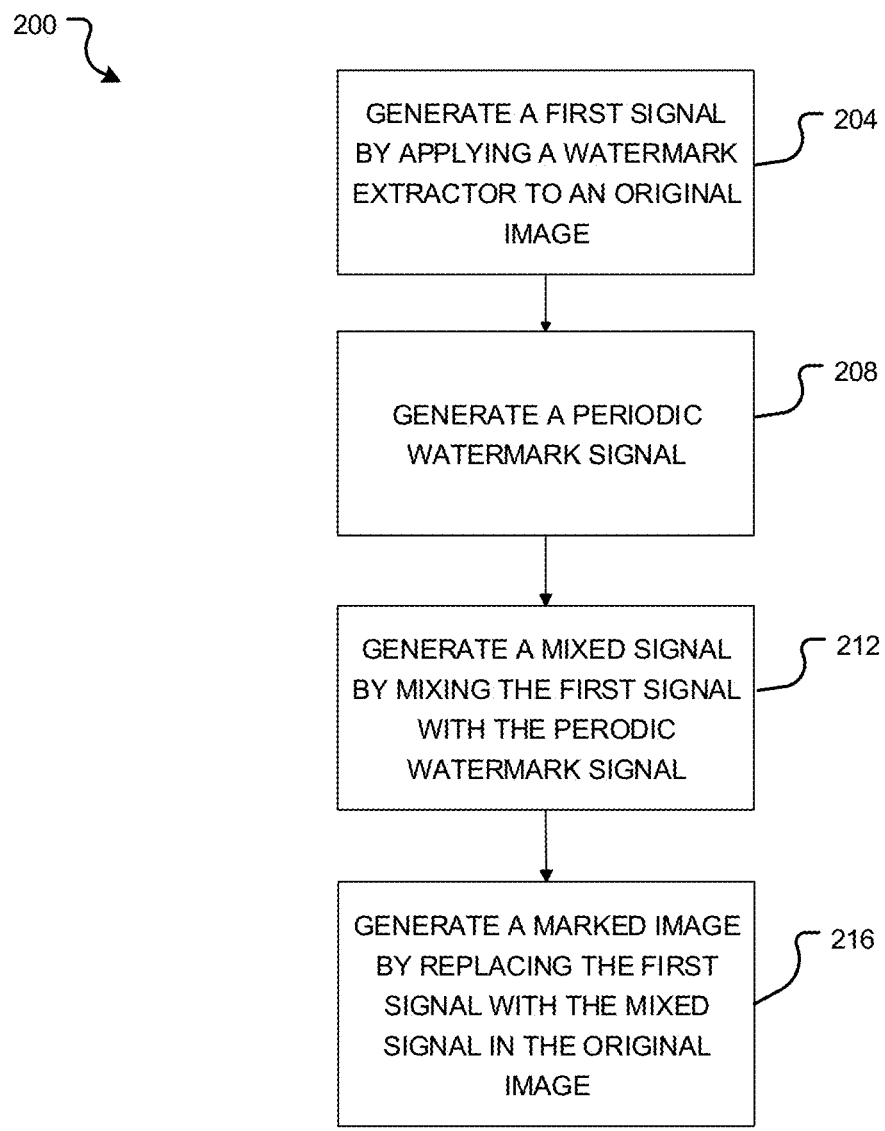
FIG. 2 is flow chart that illustrates a watermarking method in accordance with at least one embodiment of the present disclosure.

FIG. 2 is flow chart 200 that illustrates a watermarking method in accordance with at least one embodiment of the present disclosure. The method illustrated by the flow chart 200 may be performed by the watermark module 100 as the watermark module 100 executes on the processor 108a. In the following discussion of flow chart 200, reference is additionally made to FIG. 3, which is a flow diagram 300 that illustrates various watermarking operations with reference to various example images. For example, FIG. 3 includes an original image I (identified with reference number 304) that is received as input by the watermarking module 100, which adds a watermark to the original image 304 by processing the original image 304 in accordance with the methods disclosed herein.

Initially, in operation 204, the watermark module 100 generates an extracted signal E (generally identified with reference number 308) by applying a watermark extractor 136 to the original image I, 304. Here, the watermark module 100 may include an extractor component 136 that is generally configured to generate an extracted signal E, 308 from the original image signal I, 304. In at least one embodiment, the extractor component 136 extracts noise artifacts arising in an original image I, 304. Alternatively, in at least one embodiment, the extraction may occur in addition to and/or instead of with a random process that identifies where noise may desirably appear in a given sample of multimedia content. That is, it is to be appreciated that in certain embodiments, the process of creating a given sample of multimedia content may be essentially loss-less and predominately noise-less. Accordingly, to embed a digital watermark pursuant to at least one embodiment described herein an inverse of, e.g., a Wiener filter may be utilized to generate the noise signal distribution desired to hold a given watermark.

Figure 3:
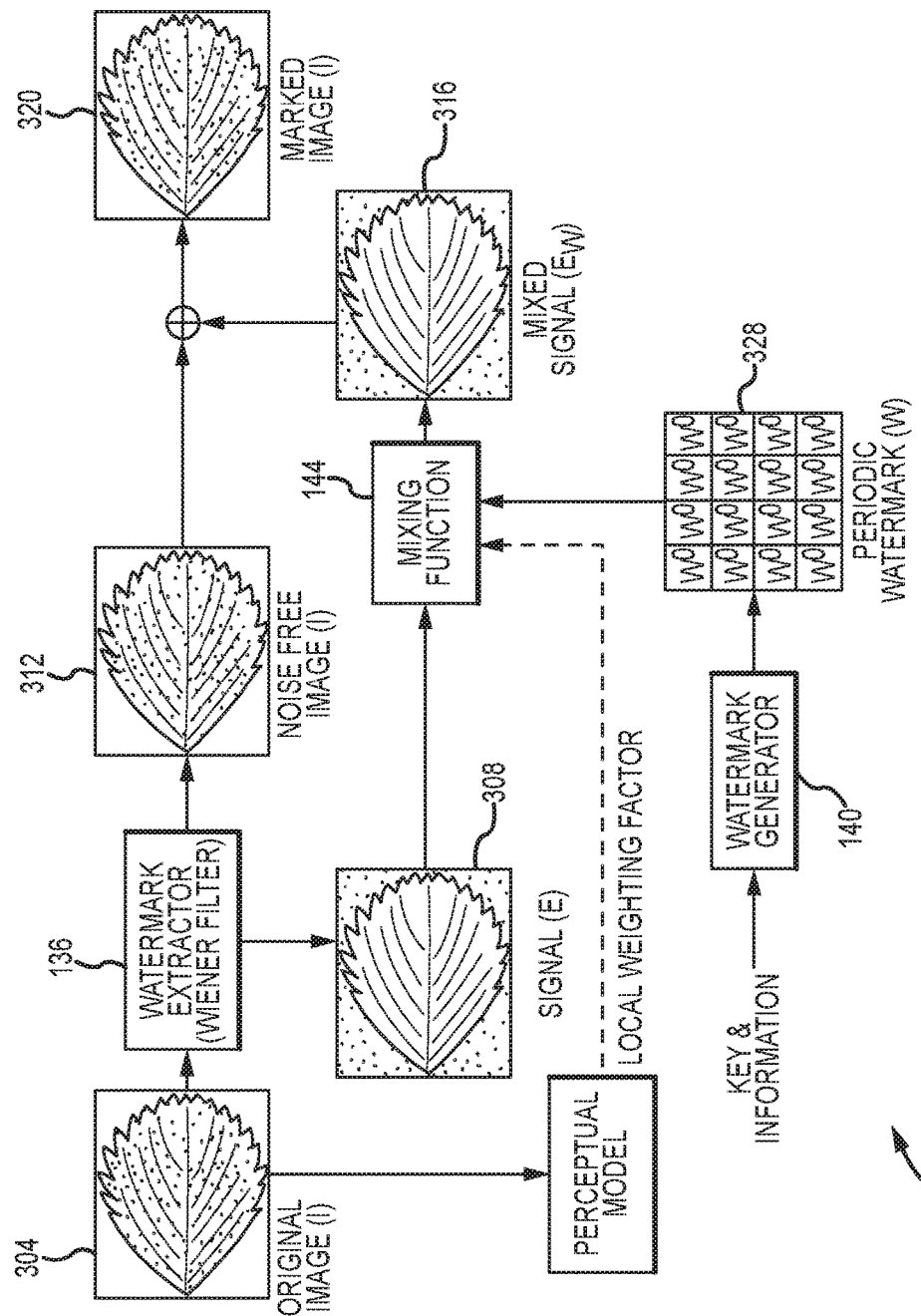
FIG. 3 is a flow diagram that illustrates various watermarking operations with reference to various example images.

As shown in FIG. 3, the watermark module 100 extracts, from the original image I, 304, an extracted signal E, 308 of size X×Y using the watermark extractor 116. In at least one embodiment, the watermark extractor 136 uses the Wiener filter:

$$I^-(x,y) = \mu(x,y) + \frac{\sigma^2(x,y) - s^2}{\sigma^2(x,y)}[I(x,y) - \mu(x,y)], \quad (1)$$

where $\mu(x,y)$ and $\sigma^2(x,y)$ are the local mean and local variance of the original image I, 304, respectively; and $s^2$ is the noise variance. If the noise variance is not available for a given sample of multimedia content, the watermark extractor 136 may use the average of the local variances for $s^2$. The extracted signal E, 308 is given by:

$$E = I - I^- \quad (2)$$

where $I^-$ 312 is the noise free image resulting from the extraction of the extracted signal E, 308 from the original image I, 304. It is to be appreciated that other filter types may be utilized in addition to and/or alternatively to a Wiener filter to identify locations within a given sample of multimedia content with respect to which a digital watermark may be added, examples of such filters include but are not limited to Helicon filters and others. Once the extracted or, as the case may be, generated extracted signal E, 308 is obtained, the extracted signal E is segmented into blocks ($v_1$, $v_2$, ..., $v_n$) of size M×M. Here, each block ($v_1$, $v_2$, ..., $v_n$) is adapted to be mixed with a corresponding watermark block in a periodic watermark generated by the watermark module 100.

Turning now to the generation of a periodic watermark, continuing reference is made to FIGS. 1-3. In operation 208, the watermark module 100 generates a periodic watermark signal 328. The watermark module 100 may include a watermark generator component 140 that is generally configured to generate a periodic watermark signal 328. A basic watermark pattern $W^o$ of the size M×M is generated with a user key. For at least one embodiment, the watermark generator 140 may use a pseudorandom number sequence that follows N(0,1) (standard normal distribution) for the basic watermark pattern. In other embodiments, the watermark generator 140 may be configured to use other number sequences. In one embodiment, the watermark generator 140 utilizes a user key that is 32 bits in length and generates a watermark block that is 64×64 in size. A watermark block of this size has a capacity on the order of $2^{4096}$, which is sufficient for carrying a 32 bit integer ID with $2^{32}$ possible variations and the probability of running into collisions is low. Additionally, this arrangement provides additional headroom for future expansion, if needed. A watermark block of this size also allows for enough number of repetitions of noise block on HD and SD frame sizes. It is to be appreciated that watermark blocks of smaller or larger sizes may be utilized for a given embodiment. The watermark generator 140 deterministically generates the watermark signal 328, for example, as a block of signals, from the unique ID in at least three steps. First, the watermark generator 140 generates a group of pseudo random numbers using the input ID as seed. In one embodiment, the watermark generator 140 generates 4096 pseudo random numbers. In other embodiments, more or less numbers, pseudo random or otherwise, may be generated. Second, the watermark generator 140 generates a N(0,1) normal distributed random number A in double precision using one of the above numbers as seed, and uses A to populate the 64×64 watermark block sequentially. Third, the watermark generator 140 applies low-pass filtering of kernel size 3 on the watermark block to limit the frequency band. In one embodiment, the low-pass filtering may be implemented through Gaussian filtering or the like. In one respect, this procedure is adapted to maximize coverage of available scope of random vectors while still keep the output noise block within a desired natural spatial frequency range, for example, of visual content. It is to be appreciated, however, that the desired spatial frequency range for the output noise block may vary based on the underlying characteristics of the multimedia content. For example, a desired spatial frequency range for textureless blue sky will vary from one used for a picture showing a forest. Further, within a given sample of multimedia content a mix of signal types, e.g., texture-rich and flat areas may be present. The watermarking of one or more of such signal types may vary in accordance with at least one embodiment of this disclosure.

Turning now to the generation of a mixed signal for use in marking the original image I, 304, continuing reference is made to FIGS. 1-3. In operation 212, the watermark module 100 generates a mixed signal EW, 316 by mixing the extracted signal E, 308 with the periodic watermark signal W(x,y), 328. It is to be appreciated, however, that the mean value of the periodic watermark signal 328, for example, when sized at 64×64 blocks, may deviate from zero. Such deviation may induce noticeable shifts in the black level of the input content, when examined on a video scope. Accordingly, when such a concern with black level shifting arises, W(x,y) is normalized by the following equation:

$$W'=(x,y)=W(x,y)-\overline{W(x,y)} \quad (3A)$$

The watermark module 100 may include a mixing function component 144 that is generally configured to generate the mixed signal 316, by mixing the extracted signal E, 308 with the periodic watermark signal W or W', 328. E and W/W' may be mixed into mixed signal $E_w$, 316 by:

$$W'(x,y)=W(x,y)-\overline{W(x,y)} \quad (3B)$$

or $$E_w(x,y)=\alpha_e E(x,y)+\alpha_w \lambda(x,y)W'(x,y) \quad (3C)$$

where $\alpha_e$ and $\alpha_w$ are global weighting factors, and $\lambda(\cdot)$ denotes a local weighting factor. The mixing function 144 may use a noise visibility function (NVF) based local weighting factor. The Local Weighting Factor A is based on the NVF and is used to determine the weighting factor for noise embedding to the underlying content, for example, a video frame or sample thereof. When desired to reduce the amount of noise applied to a frame, for example, a video sample area with low luminance, the mixing function 144 may use the following for $$\lambda(x,y) = ((1-\text{NVF}) \cdot S + \text{NVF} \cdot S_1) \cdot (L + (1-L) \cdot I/I_{max}) \quad (4)$$

where S and S1 are scaling constants. L (E[0,1]) is weighting factor on luminance level, and $I_{max}$ is maximum frame luminance. It is to be appreciated that in other embodiments, other scaling constants and local weighting factors may be utilized, as desired.

The Enhanced Noise Visibility Function (NVF)–NVF(x, y) is a local function used to determine whether the area around pixel of coordinates (x,y) has high frequency textures that helps to hide the watermark information. The enhanced NVF function is defined as:

$$N(x,y) = 1/(1 + D \cdot \eta/\eta_{max}) \quad (5)$$

Where, for at least one embodiment, D is a constant equals between 50 and 100, and η is defined as $$\eta(x,y) = \text{var}(I - \text{conv}(I, T_{3 \times 3})) \quad (6)$$

In at least one embodiment, $T_{3 \times 3}$ is a 3 by 3 matrix with all elements being one. I is the original frame pixel data array and $\eta_{max}$ in Eq. (5) is the maximum value of η in the current frame. It is to be appreciated that this NVF function helps improve the accuracy of noise visibility results when luminance gradient exists in video frame. In other embodiments, other NVF functions may be used to help improve the accuracy of noise visibility when luminance gradient exists in a given sample of multimedia content, such as a given video frame. It is also to be appreciated that the above described samples and constants may be varied to increase or decrease the hiding of a watermark. For example, in certain embodiments, it may be desirable to embed a more readily detectable (and perhaps in a video context more visible) watermark while also embedding a less detectable watermark, with the former being used to misdirect any pirates while also notifying the general public of the marked content, with the latter providing more robust watermarking.

In operation 216, the watermark 216 generates a marked image I', 320 by replacing the extracted signal E, 308 in the original image I, 304 with the mixed signal $E_w$, 316. The marked image I', r 320 is obtained by replacing the extracted signal E, 308 in the original image I, 304 with the mixed signal $E_w$, 316:

$$I'(x,y) = I'(x,y) + E_w(x,y) \quad (7)$$

Figure 4:
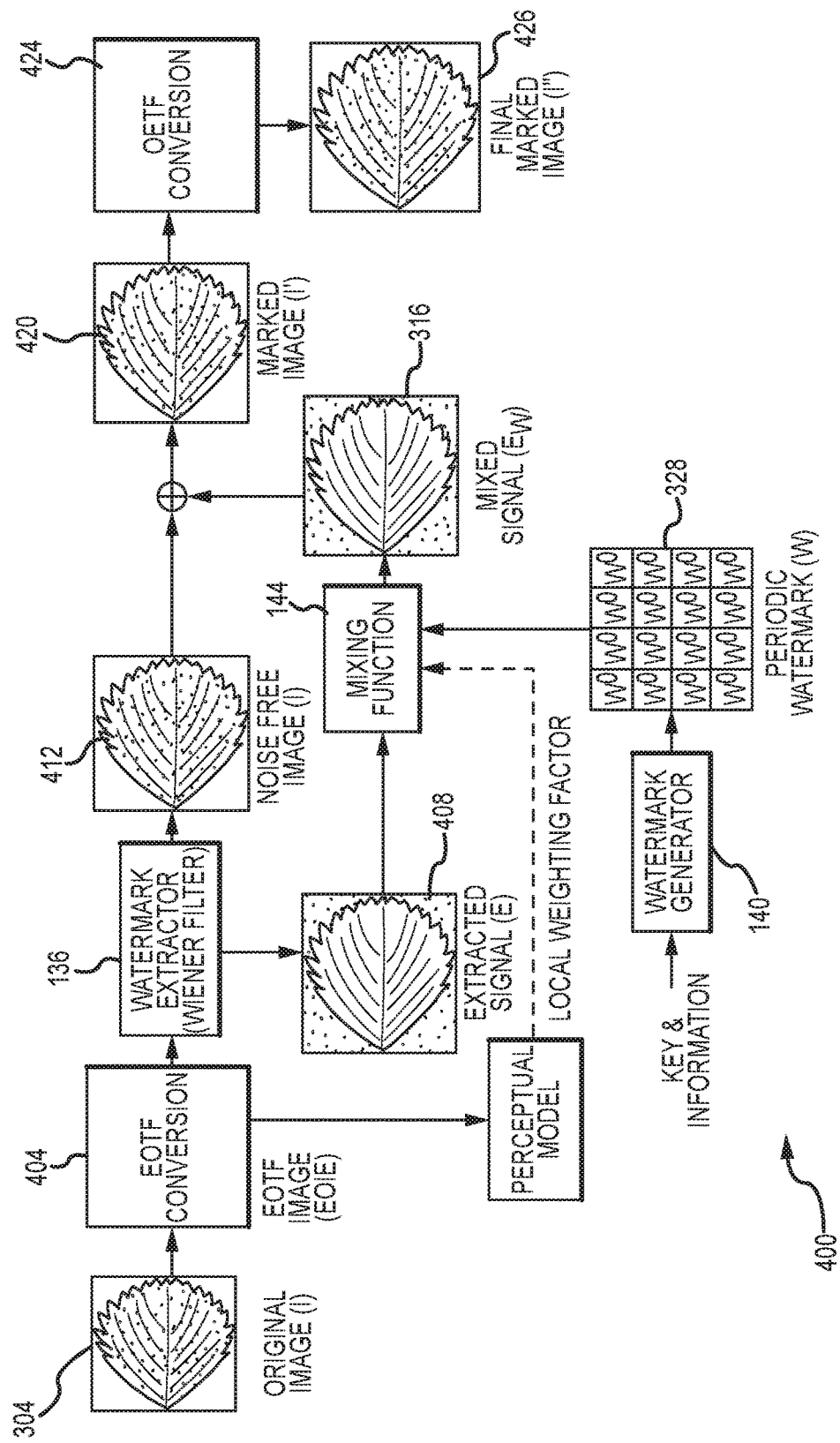
FIG. 4 is a flow diagram that illustrates various watermarking operations with reference to various example high dynamic range images.

As shown in FIG. 4, in accordance with at least one embodiment of the present disclosure, the systems, devices and methods disclosed herein may include the additional operations of applying an Electro-Optical Transfer Function ("EOTF") (per Operation 404) to the original image I, 402 and its inverse, an Optical-Electro Transfer Function (OETF) (per Operation 424), to the marked image I', 420 in order to address any undesired effects which may arise, for example, when content having High Dynamic Ranges (HDR) or other content having highly varying ranges of luminance is to be watermarked, and resulting in final marked image I", 426 As shown in FIG. 4, the processes shown in FIG. 3 are applied to the content after the EOTF conversion of the original image I, 304 occurs, resulting in the EOTF image EOIE, 404. It is to be appreciated that an EOTF conversion, and its inverse the OETF conversion, may occur by use of various known techniques, such as constant gamma correction, use of the SMPTE 2084 standard, use of the Dolby Perceptual Quantizer with the ITU-R Recommendation BT.2020, use of the Consumer Electronics Association's HDR10 Media Profile, or otherwise. That is, it is to be appreciated that the process of digital watermarking content, as per the operations shown for example in FIG. 3, may include any additional pre-marking and/or post-marking processes, as desired, to present a given set of watermarked content, where the watermarking is unobtrusive, identifiable and robust.

In one respect, the system and method disclosed herein includes an improved autocorrelation function based watermarking with side information. As described above, the disclosed system and method repeatedly embeds a pseudo random noise pattern on a given sample of multimedia content, for example, a video frame. The pseudo random noise pattern survives common modifications to video streams, e.g., transcoding, resizing and screen camcording. Detection of the watermark payload is done by calculating cross correlation between frame average and original noise pattern, with a match identified by correlation peak above pre-defined threshold for signal-to-noise ratio. The noise pattern mimics film grain that typically would not cause visibility issues. For at least one tested embodiment, both in-house and external tests did not reveal any visible artifacts.

The disclosed systems and methods are capable of embedding an entire watermark payload into a single frame. This feature allows instantaneous payload detection on high quality video streams. Because this type of detection is made possible, digital watermarking can be applied on short form contents, e.g., trailers, or even still images. Other digital watermarking solutions are typically not capable of watermarking such content in an unobtrusive, identifiable and robust manner.

The disclosed systems and methods are robust against common video transforms in spatial and temporal domains, because the disclosed detection is based on statistical 2D cross correlation on large number of samples. Repetition of the noise pattern in a frame and the averaging calculation in detection also help in reducing chances of false negative or false positive. In addition, the correlation-based algorithm allows embedding multiple layers of payloads without interfering with detection of each layer. Additionally, the disclosed systems and methods can be used together with other watermark technologies while still maintaining the same level of visibility and robustness.

The disclosed systems and methods impose no restriction on either frame resolution and/or bit depth. Testing indicates that the disclosed techniques work with the same level of quality on resolutions, for example, of SD, HD and UHD, 8 bit DVD/BD or 16 bit mastering format. In various implementations, watermark strength may be varied based on intended applications, to balance between visibility under specific video deliverable formats and robustness requirements.

The disclosed systems and methods may be used to embed more than one layer of watermark on the same sample of multimedia content, such as a video frame. At least one embodiment of this disclosure makes possible the tracking of content across a variety and multiple (as desired) workflow steps that the content may undergo. For example, a first watermark may be embedded when a video or multimedia work is initially released from original production. When the video or multimedia work is later released from a distributor or other intermediary, a second watermark may be embedded in the video or multimedia work. Thus, the detection of watermarks in the video or multimedia work may reveal at what stage of production and/or distribution the video or multimedia work was copied or an otherwise unauthorized access to such content occurred. The detection of watermarks at such various levels may also give rise to a tracking of the payment of royalty obligations along a given multimedia content's product lifecycle. The detection of each layer may be independent from existence of all or any other layers. Thus, continuing the above example, the detection process may detect either or both of the first and second watermarks. For example, an audio soundtrack may be identified by various constituent parts, such as a vocal track, a rhythm or bass track and otherwise. Each track may be provided and recorded separate of each other and may have value in and by itself worth identifying and protecting. Each such track may be watermarked such that the use of a rhythm track, for example, in a later unauthorized use in another work may be detected separate from a use of a lyrical track.

In some embodiments, the watermark embedded using the disclosed techniques may be removed by repeating the embedding process while reversing the sign of a watermark block. This removal process is particularly effective if the video or image has not gone through significantly lossy compression.

It is to be appreciated that the devices, systems, and processes for watermarking and the techniques disclosed herein, separately and/or in their entirety, may be utilized with any form of multimedia content. For at least one embodiment, such techniques may be applied to streaming video. In a streaming video session, a different ID is typically required to identify an individual viewer and the time the content was watched. This aspect of streaming video presents a challenge to watermark embedding because a pre-encoded video stream needs to be decoded, run through the embedding process, and then re-encoded. The encoding of such content may also occur at variable bit rates, with one bit rate being received at a first time and a different bit rate being received at a second time, as often predicated by network and bandwidth requirements at the then given time. Due to such constraints and others, the required computation resources for real time streaming can be high, especially when there are large numbers of simultaneous connections.

Thus, one or more of the various embodiments of the present disclosure are additionally directed to an effective streaming watermark system and method. In accordance with at least one embodiment, one or more of the I frames or P frames within each Group of Picture (GOP) are de-multiplexed, decoded, embedded, re-encoded and re-multiplexed at time of streaming. Because the disclosed watermarking may work entirely on each frame, I/P frames may be processed independently without the need to decode other frames or change the structure of file wrapping format. The frequency of embedded I/P frames may be adjusted based on available computation resources, so that either content security, streaming performance or other requirements can be prioritized. The disclosed embedding mechanism is independent of video codec or file wrapper format.

With further regard to disclosed streaming watermark systems and methods, a watermark may be embedded on I frames, or subsequent P frames. The embedding process may run as a module on streaming server and operate to embed a dynamically generated watermark ID that uniquely identifies the viewer and streaming time. In some embodiments, a dynamic embedding frequency may be used. For example, the embedding frequency may be adaptively adjusted in order to maintain server CPU usage, meet bandwidth requirements or otherwise. In one implementation of the disclosed dynamic embedding, the following approach may be used to determine if a particular I/P candidate frame should be watermarked. First, a current embedding interval is calculated using:

$$D = D_T - (D_T - D_0) \cdot e^{-\frac{I-I_0}{(1-I)(1-I_0)}} \tag{8}$$

where is $D_0$ is the target embedding frame interval, $D_T$ is the maximum allowed interval determined according to security policies, $I$ is the current CPU load, and $I_0$ is the target CPU load that the streaming server should maintain. Second, the offset O of the current I/P frame from the previous embedding position is determined. Third, the I/P frame is stored in a buffer. Additionally, if O>D, embedding on the current frame is performed, with reference to the buffered frame if needed; otherwise this operation is skipped and the frame is streamed out to the client. Following this, the procedure may loop back to the first operation until then steaming session completes. As a simplified approach, the embedding can happen on I frames only to eliminate the need of frame buffering.

The technology described herein may be implemented as logical operations and/or modules in one or more devices and/or systems. The logical operations may be implemented as a sequence of processor implemented steps executing in one or more special purpose computer devices and/or systems and as interconnected machine or circuit modules within one or more special purpose computer devices and/or systems. Likewise, the descriptions of various component modules may be provided in terms of operations executed or effected by the modules. The resulting implementation is a matter of choice, dependent on the performance requirements of the underlying implementation of the described technology. Accordingly, the logical operations making up the embodiments of the technology described herein are referred to variously as operations, steps, objects, or modules. It is to be appreciated that such operations, steps, object and/or modules are to be executed by appropriately configured systems and/or devices. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a special purpose computer system to implement the invention. One implementation of a computer program product provides a non-transitory computer program storage medium readable by a computer system and encoding a computer program. It should further be understood that the described technology may be employed in a variety of special purpose devices such as professional video/image cameras, digital content mastering software (e.g. Clipster, Amberfin), post-production transcoding systems based on either software or hardware (e.g. Rhozet, Digital Rapids, TeleStream), theatrical playback devices, as well as set top boxes for home entertainment.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A digital watermarking method, comprising
generating an extracted signal by applying a watermark extractor to an original image;
generating a mixed signal by mixing the extracted signal with a periodic watermark signal using a local weighting factor for the periodic watermark signal that attenuates a strength of the periodic watermark signal in proportion to a pixel luminance level; and
replacing the extracted signal in the original image with the mixed signal to generate a marked image.

2. The method of claim 1, comprising generating the local weighting factor using a noise visibility function having a gradient removal factor that prevents the noise visibility function from significantly incrementing at locations of spatial gradient in the original image.

3. The method of claim 1, comprising generating the local weighting factor using a noise visibility function having a density filter that prevents the periodic watermark signal from becoming visible in the marked image at spatial locations with highly dense textures.

4. The method of claim 1, wherein mixing the extracted signal with the periodic watermark signal includes applying a watermark block of size M×M to corresponding M×M sections of the extracted signal.

5. The method of claim 4, wherein the watermark block is generated by operations including
generating a plurality of pseudo random numbers using a unique input identification as a seed;
generating a N(0,1) normal distributed random number in double precision using one of the plurality of pseudo random numbers as a seed;
using the normal distributed random number to populate a watermark pattern sequentially; and
applying low-pass filtering of kernel size 3 on the watermark block to limit the frequency band.

6. The method of claim 5, wherein
the watermark block is of size 64×64; and
the operation of generating a plurality of pseudo random numbers includes generating 4096 random numbers.

7. The method of claim 5, wherein the unique input identification is 32 bits in length.

8. The method of claim 1, wherein the periodic watermark signal is a first periodic watermark signal, the method comprising
generating a third signal by applying the watermark extractor to the marked image;
generating a fourth signal by mixing the third signal with a second periodic watermark signal using a local weighting factor for the second periodic watermark signal that attenuates a strength of the second periodic watermark signal in proportion to a pixel luminance level; and
replacing the third signal in the marked image with the fourth signal to generate an additional marked image.

9. The method of claim 8, wherein the operation of replacing the extracted signal in the original image with the mixed signal and the operation of replacing the third signal in the marked image with the fourth signal occur at different stages of distribution of the original images.

10. The method of claim 1, wherein the periodic watermark signal is extractable from the marked image using the watermark extractor.

11. The method of claim 1, wherein the original image is an individual frame of a digital video.

12. The method of claim 1, wherein the original image is an individual frame of a streaming video and the method is selectively applied on either I frames or subsequent P frames of a streaming video.

13. The method of claim 1, wherein the watermark extractor uses a Wiener filter.

14. The method of claim 1, wherein the periodic watermark signal is normalized.

15. The method of claim 8, wherein either or both of the first and second periodic watermark signals are extractable from the additional marked images using the watermark extractor.

16. A digital watermarking method, comprising
applying an electro-optical transfer function to an original image to generate an EOTF image;
generating an extracted signal by applying a watermark extractor to the EOTF image;
generating a mixed signal by mixing the extracted signal with a periodic watermark signal using a local weighting factor for the periodic watermark signal that attenuates a strength of the watermark signal in proportion to a pixel luminance level;

replacing the extracted signal in the EOTF image with the mixed signal to generate a marked image; and applying an optical-electro transfer function to the marked image to generate a final marked image, wherein the optical-electro transfer function utilized performs an inverse operation of the electro-optical transfer function, and wherein the periodic watermark signal is extractable from the final marked image.

17. The method of claim 16, wherein the periodic watermark signal is normalized.

18. The method of claim 16, wherein the electro-optical transfer function applies a constant gamma correction to the original image.

19. The method of claim 16, wherein the electro-optical transfer function applies a SMPTE 2084 standard compliant transfer function to the original image.

20. The method of claim 16, wherein the electro-optical transfer function applies transfer function compliant with a Dolby Perceptual Quantizer to the original image.

21. The method of claim 20, wherein the electro-optical transfer function is compliant with ITU-R Recommendation BT.2020.

22. The method of claim 16, wherein the original image has a high dynamic range.

23. The method of claim 16, wherein the original image has highly varying ranges of luminance.

24. The method of claim 16, comprising generating the local weighting factor using a noise visibility function having a gradient removal factor that prevents the noise visibility function from significantly incrementing at locations of spatial gradient in the EOTF image.

25. The method of claim 16, comprising generating the local weighting factor using a noise visibility function having a density filter that prevents the watermark from becoming visible at spatial locations with highly dense textures.

26. The method of claim 16, wherein the periodic watermark signal comprises a watermark block having a size of M×M sections.

27. The method of claim 26, wherein the extracted signal comprises a block of M×M sections and each of the M×M sections of the watermark block correspond to the M×M sections of the extracted signal.

28. The method of claim 27, further comprising generating the watermark block from a plurality of pseudo random numbers.

29. The method of claim 28, wherein the plurality of pseudo random numbers is generated using a unique input identification.

30. The method of claim 29, wherein the unique input identification is 32 bits in length.

31. The method of claim 28, wherein the generation of the watermark block comprises generating a N(0,1) normal distributed random number in double precision using at least one of the plurality of pseudo random numbers as a seed.

32. The method of claim 31, wherein the generation of the watermark block comprises using the normal distributed random number to populate a watermark pattern sequentially.

33. The method of claim 26, comprising
generating the watermark block; and
limiting a frequency band used to mix the watermark block with the extracted signal by applying low-pass filtering to the watermark block.

34. The method of claim 33, wherein the low-pass filtering utilizes a kernel size of 3.

35. The method of claim 16, wherein the original image is an individual frame of a digital video.

36. The method of claim 16, wherein the original image is an individual frame of a streaming video.

37. The method of claim 36, wherein the streaming video includes a sequence of I frames and the method is applied to two or more of the I frames.

38. The method of claim 16, wherein the watermark extractor uses an average of two or more local noise variances for the original image to generate the extracted signal.

39. The method of claim 16, wherein the watermark extractor comprises a Helicon filter.

40. The method of claim 16, wherein the final image is humanly perceptible and includes a watermark having a noise pattern that resembles film grain.

41. The method of claim 16, wherein the periodic watermark signal uniquely identifies a viewer and a time at which the final image is communicated to the viewer.

42. The method of claim 41, wherein the original image is a frame of a streaming video to be communicated to the viewer over a telecommunications network.

43. The method of claim 42, wherein the telecommunications network comprises the Internet.

44. The method of claim 42, wherein the periodic watermark signal is dynamically generated and applied to the EOTF image of the frame of the streaming video immediately prior to a time of communication of the final image in the streaming video to the viewer.

45. The method of claim 16, wherein the mixed signal is generated based on an embedding interval.

46. The method of claim 45, wherein the final image is communicated to a receiving device over a network connection and the embedding interval is determined based on a target CPU load for a streaming server utilized to communicate the final image.

47. The method of claim 46, wherein the receiving device is a home set-top box.

* * * * *